US011951399B2

(12) United States Patent
Sachson et al.

(10) Patent No.: US 11,951,399 B2
(45) Date of Patent: Apr. 9, 2024

(54) FOOTPRINTS IN VIRTUAL ENVIRONMENTS

(71) Applicants: Sony Group Corporation, Tokyo (JP); Sony Corporation of America, New York, NY (US)

(72) Inventors: Thomas Sachson, Malibu, CA (US); James Marcus, Culver City, CA (US); Eric Benjamin Fruchter, Los Angeles, CA (US)

(73) Assignees: Sony Group Corporation, Tokyo (JP); Sony Corporation of America, New York, NY (US)

( * ) Notice: Subject to any disclaimer, the term of this patent is extended or adjusted under 35 U.S.C. 154(b) by 95 days.

(21) Appl. No.: 17/518,365

(22) Filed: Nov. 3, 2021

(65) Prior Publication Data

US 2022/0134234 A1 May 5, 2022

Related U.S. Application Data

(60) Provisional application No. 63/109,500, filed on Nov. 4, 2020.

(51) Int. Cl.
*A63F 13/69* (2014.01)
*A63F 13/54* (2014.01)
(Continued)

(52) U.S. Cl.
CPC .............. *A63F 13/69* (2014.09); *A63F 13/54* (2014.09); *A63F 13/61* (2014.09); *A63F 13/63* (2014.09); *A63F 13/792* (2014.09)

(58) Field of Classification Search
CPC ................................ A63F 13/61; A63F 13/63
See application file for complete search history.

(56) References Cited

U.S. PATENT DOCUMENTS

2017/0270702 A1 9/2017 Gauthier et al.
2019/0299097 A1* 10/2019 Hadjadj .................. A63F 13/65
(Continued)

OTHER PUBLICATIONS

UnrealCG, "How To Make Simple footprint System in Unreal Engine—Decals," available at https://www.youtube.com/watch?v=bNfRgGOfq1k, Dec. 26, 2017. (Year: 2017).*
(Continued)

*Primary Examiner* — Jay Trent Liddle
(74) *Attorney, Agent, or Firm* — Procopio, Cory, Hargreaves & Savitch LLP (57) ABSTRACT

Methods, systems, and computer-readable storage media for providing footprints in a computer system that provides a virtual environment, including: accessing an avatar record, where the avatar record indicates an avatar representation that includes data to provide a visual representation of an avatar; receiving a selection of a footprint; accessing a footprint record, where the footprint record includes footprint representations that include data to provide a visual representation of the selected footprint as a footprint representation; associating the footprint representation with the avatar representation; receiving avatar movement input that indicates movement of the avatar within the virtual environment; and generating visual data representing the movement of the avatar and footprints in the virtual environment using the avatar representation and the footprint representation, where the footprints are placed in the virtual environment following the avatar as the avatar moves in the virtual environment.

15 Claims, 4 Drawing Sheets

(51) Int. Cl.
   *A63F 13/61*    (2014.01)
   *A63F 13/63*    (2014.01)
   *A63F 13/792*   (2014.01)

(56) References Cited

U.S. PATENT DOCUMENTS

| | | | |
|---|---|---|---|
| 2020/0038755 A1 | 2/2020 | Kojima | |
| 2020/0070044 A1* | 3/2020 | Seo | G06F 3/165 |
| 2022/0114905 A1* | 4/2022 | Shiffman | G06F 3/04842 |
| 2022/0291742 A1* | 9/2022 | Otsuka | G06F 3/012 |

OTHER PUBLICATIONS

Ipxhere, mage of shoe print, available at https://pxhere.com/en/photo/772982, Feb. 20, 2017 (Year: 2017).*

Sikstrom, Erik et al., Avatar Weight Estimates Based on Footstep Sounds in Three Presentation Formats, Aalborg University, Dec. 28, 2015, IEEE Jul. 22, 2021, pp. 62-66.

* cited by examiner

FOOTPRINTS IN VIRTUAL ENVIRONMENTS

CROSS-REFERENCE TO RELATED APPLICATIONS

This application claims the benefit of priority under 35 U.S.C. § 119(e) of U.S. Provisional Patent Application No. 63/109,500, filed Nov. 4, 2020, entitled "Footprints in Virtual Environments". The disclosure of the above-referenced application is incorporated herein by reference.

BACKGROUND

Field

The present disclosure relates to presenting representations in a virtual environment, and more specifically, to providing visual and audio representations of movement and actions by avatars in the virtual environment.

Background

A virtual environment is a networked application that allows users to interact with both the computing environment and other users. However, current virtual environments have limited ways to show movement and actions.

SUMMARY

The present disclosure provides for visual and audio representations of movement and actions by avatars in a virtual environment, presented as visual indications on walking surfaces, such as footprints on a surface. In one implementation, a computer system provides a game or virtual environment, and an avatar's feet create personal expressions, music tributes, and/or brand messages as they walk or run through the world.

In one implementation, a method for providing footprints in a computer system that provides a virtual environment is disclosed. The method includes: accessing an avatar record, where the avatar record indicates an avatar representation that includes data to provide a visual representation of an avatar; receiving a selection of a footprint; accessing a footprint record, where the footprint record includes footprint representations that include data to provide a visual representation of the selected footprint as a footprint representation; associating the footprint representation with the avatar representation; receiving avatar movement input that indicates movement of the avatar within the virtual environment; and generating visual data representing the movement of the avatar and footprints in the virtual environment using the avatar representation and the footprint representation, where the footprints are placed in the virtual environment following the avatar as the avatar moves in the virtual environment.

In one implementation, the footprint representation includes footprint sound data, and further including generating audio data with the visual data using the footprint sound data. In one implementation, the footprint representation includes representation in any color, size, or shape selected or created by the user. In one implementation, the footprint representation includes one of patterned or random representation. In one implementation, the footprint representation includes set shapes including human feet or animal feet. In one implementation, the footprint representation includes multiple footprints strung together to create at least one of sentences, poems, brand tag lines, lyrics, and musical notes. In one implementation, the footprints remain in the virtual environment for a set period of time in which the user pays or receives extra to have the footprints last longer. In one implementation, the footprint representation includes at least one of a brand, sports team, artist, and label. In one implementation, the footprints are only visible by certain types of other players. In one implementation, the footprint representation is at least one of paint, flames, ice, and embossed. In one implementation, the method further includes applying the footprints to interact with the virtual environment including causing, enhancing, or enabling growth of vegetation.

In another implementation, a system for providing footprints in a virtual environment is disclosed. The system includes: an avatar record including avatar representations that include data to provide visual representations of avatars; a footprint record including footprint representations that include data to provide visual representations of footprints; a processor to receive a selection of an avatar made by a user using a user device, the processor to access the avatar record to retrieve the data to provide a visual representation of the selected avatar as an avatar representation, and the processor to receive a selection of a footprint made by the user using the user device, the processor to access the footprint record to retrieve the data to provide a visual representation of the selected footprint as a footprint representation; an associator to associate the footprint representation with the avatar representation; and a move generator to receive avatar movement input from the user device and generate visual data representing the movement of the selected avatar and the selected footprint in the virtual environment, wherein the footprint representation is placed in the virtual environment following the avatar representation as the selected avatar moves in the virtual environment, wherein the processor displays the visual data representing the movement of the selected avatar and the selected footprint on a visual display.

In one implementation, the footprint representation includes representation sound data, and further including generating audio data with the visual data using the representation sound data. In one implementation, the move generator generates variations in presentation and behavior of the selected footprint. In one implementation, the variations in presentation and behavior generated by the move generator include variations in the visual representation of the footprints being subjective so that the footprints appear different to different avatars. In one implementation, the variations in the visual representation includes targeted advertising.

In another implementation, a non-transitory computer-readable storage medium storing a computer program to provide footprint representations in a computer that provides a virtual environment is disclosed. The computer program includes executable instructions that cause the computer to: access an avatar record, where the avatar record indicates an avatar representation that includes data to provide a visual representation of an avatar as an avatar representation; receive a selection of a footprint made by a user; access a footprint record, wherein the footprint record includes footprint representations that include data to provide a visual representation of a selected footprint as a footprint representation; associate the footprint representation with the avatar representation; receive avatar movement input that indicates movement of the avatar within the virtual environment; and generate visual data representing the movement of the avatar and footprints in the virtual environment using the avatar representation and the footprint representation, wherein the footprints are placed in the virtual environment following the avatar as the avatar moves in the virtual environment.

In one implementation, the footprint representation includes representation sound data, and further including executable instructions that cause the computer to generate audio data with the visual data using the representation sound data. In one implementation, the footprint representation remains in the virtual environment for a set period of time in which the user pays or receives extra to have the footprint representation last longer. In one implementation, the footprints placed in the virtual environment act as a motion indication in medical imaging with customizable visual and audio representations.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, current virtual environments have limited ways to show expressions of movement and actions.

Certain implementations of the present disclosure include apparatus and methods to implement a technique for visual and audio representations of movement and actions by avatars in a virtual environment, presented as visual indications on walking surfaces, such as footprints on a floor. In one implementation, a computer system provides a game or virtual environment, and feet of an avatar create personal expressions, music tributes, and/or brand messages as the avatar walks or runs through the world. After reading below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

Features provided in implementations can include, but are not limited to, one or more of the following items: user selection of footprints, appearance and behavior; and relationship between footprints and content, such as a song or music artist.

In one implementation, footprints are provided in a virtual environment, where a computer system provides the virtual environment through a server system and client systems. For example, game consoles or mobile devices can connect to a server system through the Internet. The server system stores data representing the virtual environment and avatars for users, and data representing footprints and footprint behaviors for avatars in the virtual environment.

In operation, a user connects the client system of the user (e.g., a mobile device) to the server system. The server system and client systems exchange data to present images and sound representing a virtual environment through the client systems. The user has an avatar and can select aspects of the avatar's appearance and behavior in the virtual environment, including selecting footprints for the avatar. The footprints are visual representations in the virtual environment that can be seen on client systems. One example is a blue glowing footprint with associated music. When this footprint is selected for the avatar, as the avatar walks in the virtual environment, blue glowing footprints are shown where the avatar's feet have been placed. Further, in the blue glowing footprint example, a sound (e.g., a musical note) is played with each step (when the avatar's foot contacts a walking surface). This combination presents a visual and audio experience in the virtual environment that the user can customize and other users can experience through their client systems.

Figure 1:
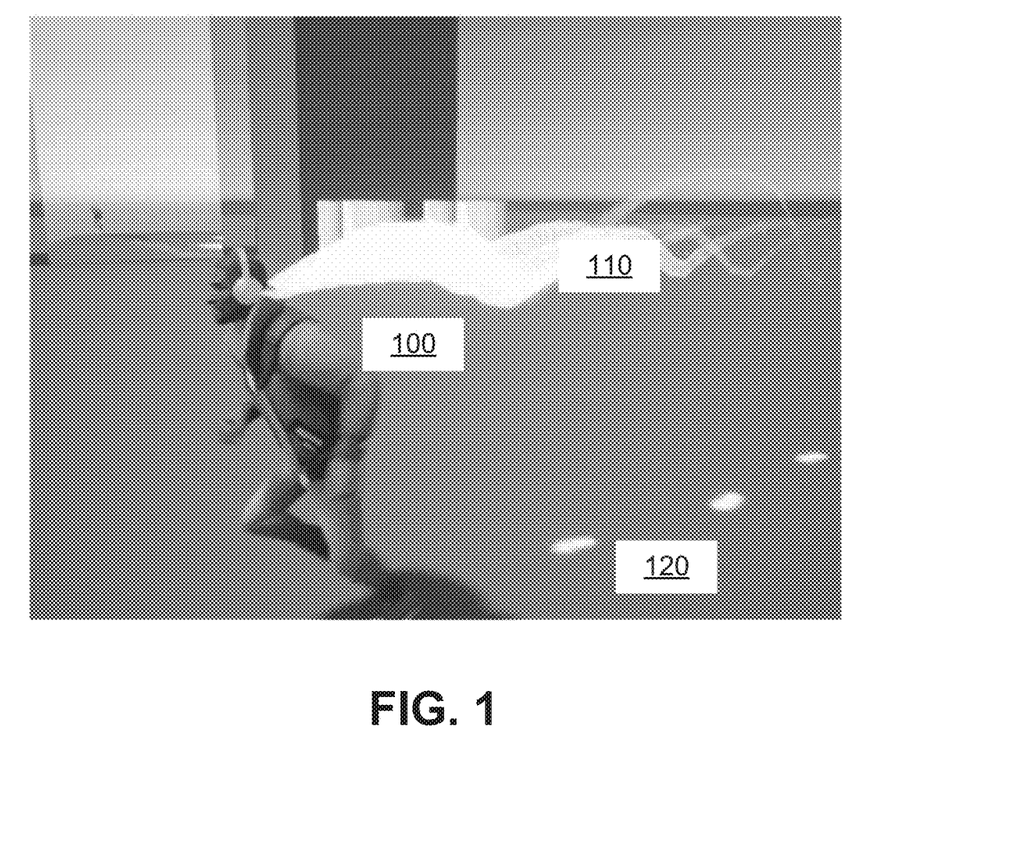
FIG. 1 shows an example of an image of an avatar with footprints.

FIG. 1 shows an example of an image of an avatar 100 with footprints 120. The image may include other representations such as a plume 130, which may include a banner (e.g., musical notes or lyrics of the song being played).

In one implementation, the virtual environment is provided as an online music experience. The footprints may be used to enhance the user experience and provide opportunities for social expression and interaction. For example, the footprints can provide visual and musical expression of musical interests of the user, such as through artist or album images, songs, music, and lyrics.

In another implementation, the virtual environment is provided as an online game experience. The footprints are used to enhance the game user experience. For example, the footprints can provide visual and sound expression of the user's game performance or social interaction, such as shapes, colors, or sounds related to a player's performance or group affiliations. In one example, avatars on the same team in a game each have footprints that match in color and sound.

In one implementation, players purchase or activate footprints for commercialization. For example, a player can purchase a footprint in a game, with proceeds of the sale and royalties for the use going to one or more entities, such as the game provider, a content provider, a charity, and a brand company. In one example, a player buys a shoe designed to match a real-world shoe produced by a company with a relationship to a music artist. The money for the sale is split among the game provider, the shoe company, and the artist. Similarly, the game developer may pay a royalty or fee to the shoe company and the artist, as the shoe is used in game (or reversed, receive a royalty from the shoe company and artist). In a music environment example, music by an artist is played as footprints are placed, a royalty is paid to the artist based on the amount of the artist's music played.

Figure 2:
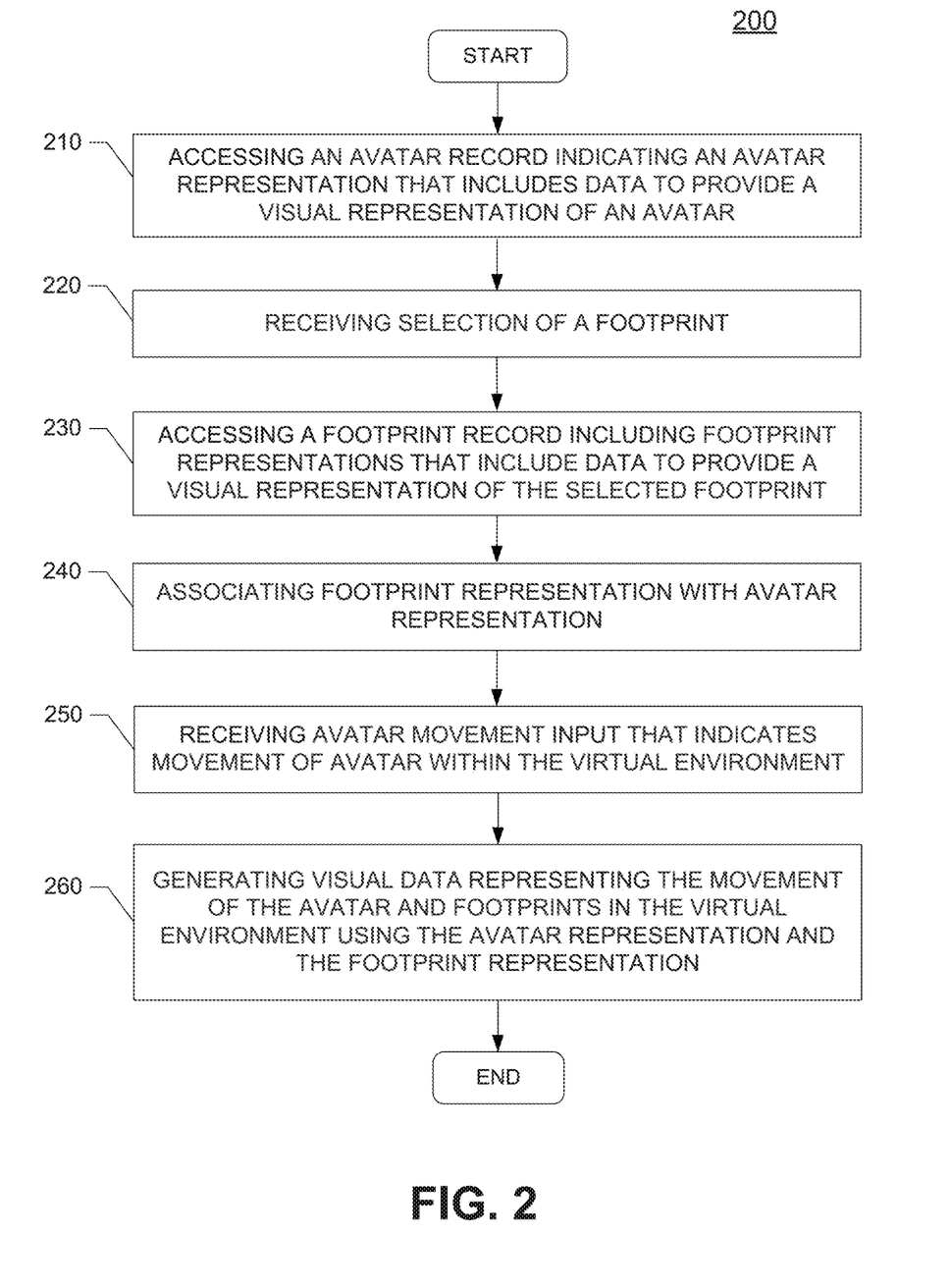
FIG. 2 is a flow diagram of a method for providing footprints in a computer system that provides a virtual environment in accordance with one implementation of the present disclosure.

FIG. 2 is a flow diagram of a method 200 for providing footprints in a computer system that provides a virtual environment in accordance with one implementation of the present disclosure.

In the illustrated implementation of FIG. 2, the method 200 includes accessing, at block 210, an avatar record indicating an avatar representation that includes data to provide a visual representation of an avatar. A selection of a footprint is received, at block 220. A footprint record including footprint representations that include data to provide a visual representation of the selected footprint (i.e., a footprint representation) is accessed, at block 230. The footprint representation is then associated with the avatar representation, at block 240.

Example implementations of various footprints and behavior include, but are not limited to, alone or in combination: footprints can be any color, size, or shape selected or created by a user; footprints can vary in pattern (i.e., patterned or random); footprints can use set shapes, such as human feet or animal feet; footprints can have any text (e.g., single letter, to partial words, to words in sequence) embedded in them or presented near them; footprint can be letters or texts (without a surrounding image); footprints can have any image, video, and/or emoji embedded in them (e.g., a shoe sole imprint such as a zigzag pattern for a particular shoe brand); multiple footprints can be strung together to create sentences, poems, brand tag lines, lyrics, and/or musical notes; footprints can be selected by user from pre-existing selection or customized by user; letters, words, images, videos embedded in footprints can be sold, earned, gifted, or given away from/to user; footprints can remain for minutes, hours, days in which the user may pay/receive extra to have footprints last longer; footprints can be only visible by certain types of other players if designated by the footprint creator; footprints can help other users/players find each other (e.g., games like hide and seek enabled); selected images, words, sounds, such as bad words and/or hate speech, can be restricted; brands can reward users (coins, merch, contests) for stamping their logos as the users walk through the virtual world; scarcity aspect can be implemented; brands (e.g., CPG, services, etc.), sports teams, artists, and/or labels can pay for messages created and seen; brands can pay more for representations to last longer; footprints can be paint, flames, ice, and/or embossed; footprints can have Easter eggs and/or prizes in them, if another user interacts with them accordingly (prize from brand and/or artist); footprints can have walking tours and/or quests where people follow representations and learn about music along the way; footprints act as a step counter that contributes to reward systems, social systems, or charity systems (e.g., contribution or promotion); footprints can interact with environment, such as to cause, enhance, or enable growth of vegetation; selections or use of steps/footprints act as a voting system and with enough players who choose a specific step can then affect the environment, venue, region theme, and/or mood; and players/users can plant special footprint that acts as a means of communicating a message to other players, and even allows direct messaging or opens portal to locations, such as other players' personalized listening spaces.

In the illustrated implementation of FIG. 2, the method 200 further includes receiving, at block 250, avatar movement input that indicates movement of the avatar within the virtual environment, and generating, at block 260, visual data representing the movement of the avatar and footprints in the virtual environment using the avatar representation and the footprint representation. In one implementation, the footprints are placed in the virtual environment following the avatar as the avatar moves in the virtual environment. In one implementation, the banner representation includes representation sound data, and further includes generating audio data with the visual data using the representation sound data.

Some implementations apply the representation of footprints and motion indication to other types of representations and information. Examples include, but are not limited to, alone or in combination: map tools to show movement of objects or users (a trail can help a user locate another user); trails or paths showing movement of other objects or user tools, such as a cursor, sight, or eyeline; and a motion indication in medical imaging with customizable visual and audio representations (e.g., tracked cells leave a selected type of trail).

Figure 3:
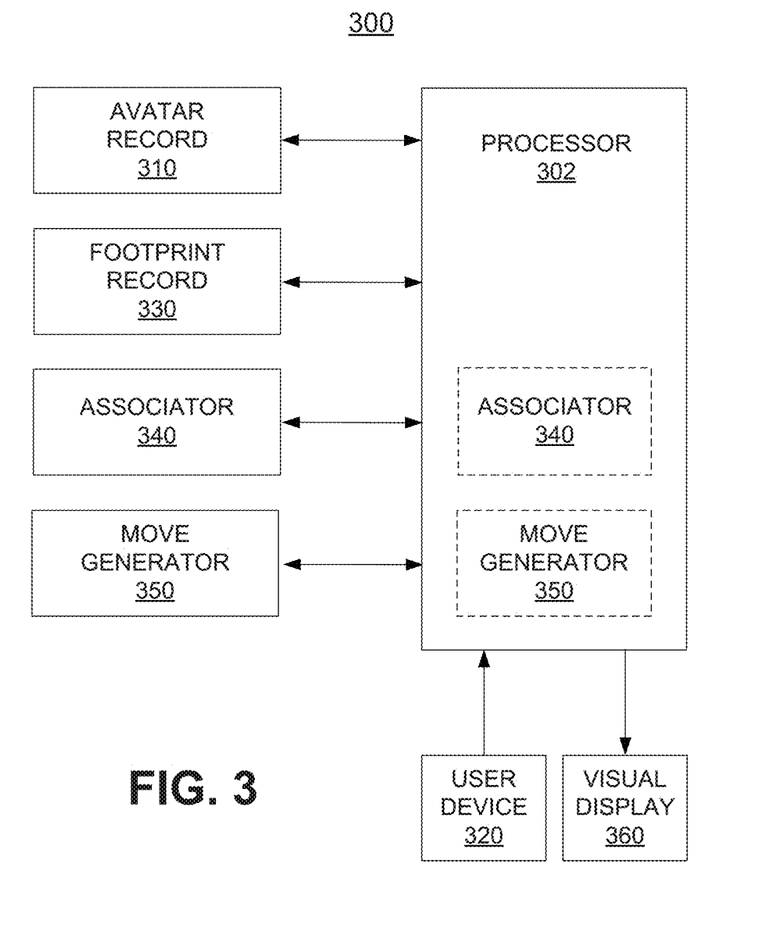
FIG. 3 is a block diagram of a system for providing footprints in a virtual environment in accordance with one implementation of the present disclosure.

FIG. 3 is a block diagram of a system 300 for providing footprints in a virtual environment in accordance with one implementation of the present disclosure. In the illustrated implementation of FIG. 3, the system 300 includes a processor 302, avatar record 310, footprint record 330, an associator 340, a move generator 350, a user device 320, and a visual display 360. In an alternative implementation, the associator 340 and the move generator 350 are situated within the processor 302.

In one implementation, a user or player selects a representation of an avatar using a user device 320 and sends the selection to the processor 302. The processor 302 accesses the avatar record 310 which includes avatar representations that include data to provide visual representations of avatars.

In one implementation, the user or player also selects a footprint representation using the user device 320 and sends the selection to the processor 302. The processor 302 accesses the footprint record 330 which includes footprint representations that include data to provide visual representations of footprints.

In one implementation, the processor 302 receives a selection of an avatar made by the user using the user device 320. The processor 302 accesses the avatar record 310 to retrieve the data to provide a visual representation of the selected avatar as an avatar representation.

In one implementation, the processor 302 also receives a selection of a footprint made by the user using the user device 320. The processor 302 accesses the footprint record 330 to retrieve the data to provide a visual representation of the selected footprint as a footprint representation.

In one implementation, the associator 340 associates the footprint representation accessed from the footprint record 330 with the avatar representation accessed from the avatar record 310.

In one implementation, the move generator 350 receives avatar movement input from the user device 320 and generates visual data representing the movement of the selected avatar and the selected footprint in the virtual environment using the avatar representation and the footprint representation, respectively. In one implementation, the footprints are placed in the virtual environment following the avatar representation as the selected avatar moves in the virtual environment. In one implementation, the footprint representation includes representation sound data, and further includes generating audio data with the visual data using the representation sound data.

In one implementation, the processor 302 displays the visual data on the visual display 360.

In other implementations, the server system (e.g., the system 300) and client systems (e.g., user device 320) provide variations in the presentation and behavior of footprints. Examples include, but are not limited to, alone or in combination: footprints can be or include trails or other effects along the ground, rather than single footprints alone;

footprints can be on other surfaces, such as walls, ceiling, objects; footprints can be prints from any body part, such as hands, body, head, or tail; footprints can be projected onto surfaces not in contact with the avatar; footprints can be dynamic, changing over time or with other environment changes, such as time of day or avatar status; footprints can interact with other footprints or avatar properties, causing different effects (e.g., footprints for an avatar flash quickly when near another avatar or footprint for an avatar that shares musical favorites, for example, based on user information stored by the server system or the client systems); and footprints can be subjective so that they appear different to different avatars, such as different images or text for friends and for public, or targeted advertising, or depending on the nature of the client system (e.g., an animated image for a game console and a static image for a mobile device).

Figure 4A:
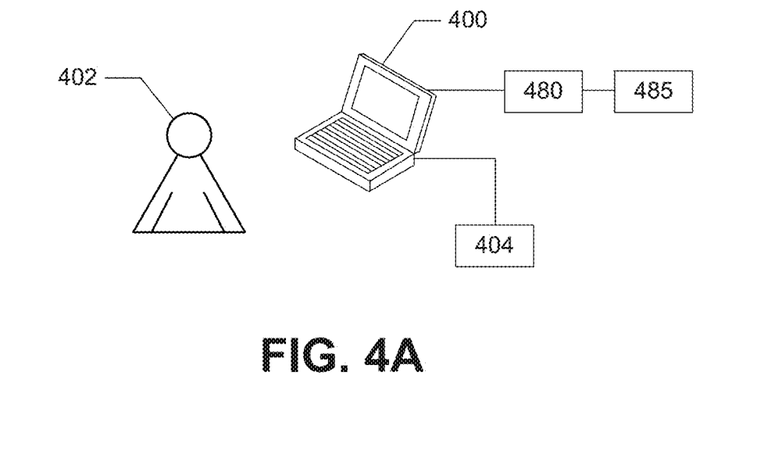
FIG. 4A is a representation of a computer system and a user in accordance with an implementation of the present disclosure.

FIG. 4A is a representation of a computer system 400 and a user 402 in accordance with an implementation of the present disclosure. The user 402 uses the computer system 400 to implement an application 490 for providing footprint representations as illustrated and described with respect to the method 200 in FIG. 2 and the system 300 in FIG. 3.

Figure 4B:
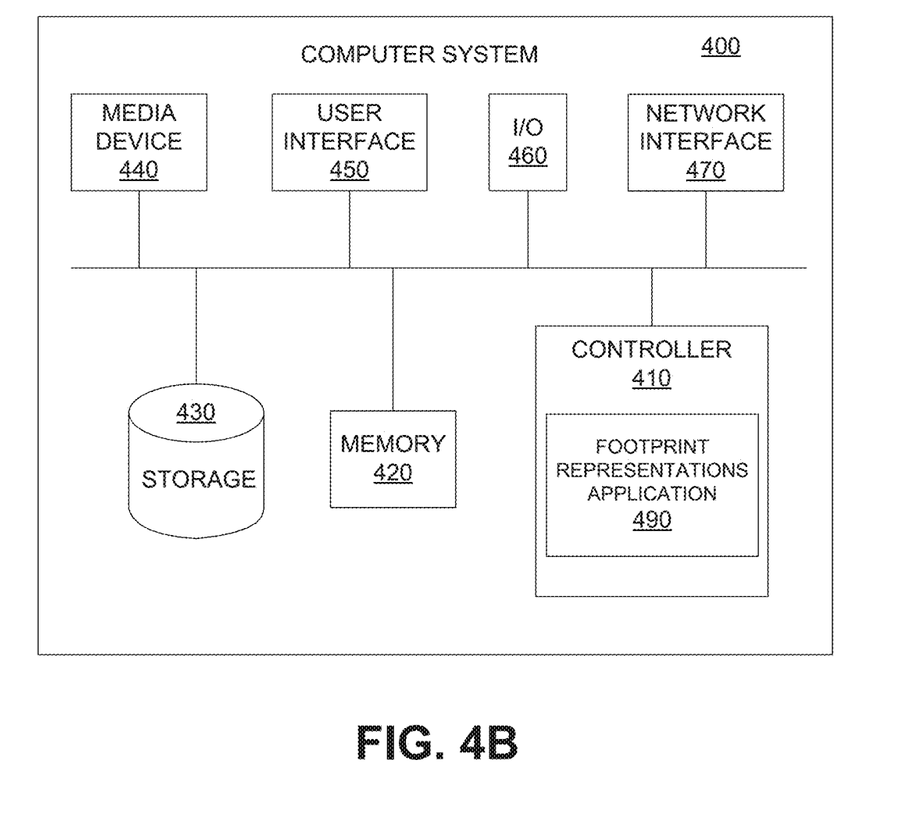
FIG. 4B is a functional block diagram illustrating the computer system hosting the footprint representation application in accordance with an implementation of the present disclosure.

The computer system 400 stores and executes the footprint representation application 490 of FIG. 4B. In addition, the computer system 400 may be in communication with a software program 404. Software program 404 may include the software code for the footprint representation application 490. Software program 404 may be loaded on an external medium such as a CD, DVD, or a storage drive, as will be explained further below.

Furthermore, the computer system 400 may be connected to a network 480. The network 480 can be connected in various different architectures, for example, client-server architecture, a Peer-to-Peer network architecture, or other type of architectures. For example, network 480 can be in communication with a server 485 that coordinates engines and data used within the footprint representation application 490. Also, the network can be different types of networks. For example, the network 480 can be the Internet, a Local Area Network or any variations of Local Area Network, a Wide Area Network, a Metropolitan Area Network, an Intranet or Extranet, or a wireless network.

FIG. 4B is a functional block diagram illustrating the computer system 400 hosting the footprint representation application 490 in accordance with an implementation of the present disclosure. A controller 410 is a programmable processor and controls the operation of the computer system 400 and its components. The controller 410 loads instructions (e.g., in the form of a computer program) from the memory 420 or an embedded controller memory (not shown) and executes these instructions to control the system, such as to provide the data processing. In its execution, the controller 410 provides the footprint representation application 490 with a software system. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data either temporarily or for long periods of time for use by the other components of the computer system 400. For example, storage 430 stores data used by the footprint representation application 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user 402. In one implementation, the user interface 450 includes a keyboard, a mouse, audio speakers, and a display. The controller 410 uses input from the user 402 to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

In one implementation, the system 300 is a system configured entirely with hardware including one or more digital signal processors (DSPs), general purpose microprocessors, application specific integrated circuits (ASICs), field programmable gate/logic arrays (FPGAs), or other equivalent integrated or discrete logic circuitry. In another implementation, the system 300 is configured with a combination of hardware and software.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of the above-discussed examples are not necessarily required in a particular implementation of the present disclosure. Further, it is to be understood that the description and drawings presented herein are representative of the subject matter that is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for providing footprints in a computer system that provides a virtual environment, the method comprising:
   accessing an avatar record, Where the avatar record indicates an avatar representation that includes data to provide a visual representation of an avatar;
   receiving a selection of a footprint,
   accessing a footprint record, where the footprint record includes footprint representations that include data to provide a visual representation of the selected footprint as a footprint representation;
   associating the footprint representation with the avatar representation;
   receiving avatar movement input that indicates movement of the avatar within the virtual environment; and
   generating visual data representing the movement of the avatar and footprints in the virtual environment using the avatar representation and the footprint representation, where the footprints are placed in the virtual environment following the avatar as the avatar moves in the virtual enviromnent,
   wherein the footprints are only visible by certain types of other players.

2. The method of claim 1, where the footprint representation includes footprint sound data, and
   further comprising generating audio data with the visual data using the footprint sound data.

3. The method of claim 1, wherein the footprint representation includes representation in any color, size, or shape selected or created by the user.

4. The method of claim 1, wherein the footprint representation includes one of patterned or random representation.

5. The method of claim 1, wherein the footprint representation includes set shapes including human feet or animal feet.

6. The method of claim 1, wherein the footprint representation includes multiple footprints strung together to create at least one of sentences, poems, brand tag lines, lyrics, and musical notes.

7. The method of claim 1, wherein the footprints remain in the virtual environment for a set period of time.

8. The method of claim 1, wherein the footprint representation includes at least one of a brand, sports team, artist, and label.

9. The method of claim 1, wherein the footprint representation is at least one of paint, flames, ice, and embossed.

10. The method of claim 1, further comprising
    applying the footprints to interact with the virtual environment including causing, enhancing, or enabling growth of vegetation.

11. A non-transitory computer-readable storage medium storing a computer program to provide footprint representations in a computer that provides a virtual environment, the computer program comprising executable instructions that cause the computer to:
    access an avatar record, where the avatar record indicates an avatar representation that includes data to provide a visual representation of an avatar as an avatar representation;
    receive a selection of a footprint made by a user;
    access a footprint record, wherein the footprint record includes footprint representations that include data to provide a visual representation of a selected footprint as a footprint representation;
    associate the footprint representation with the avatar representation;
    receive avatar movement input that indicates movement of the avatar within the virtual environment; and
    generate visual data representing the movement of the avatar and footprints in the virtual environment using the avatar representation and the footprint representation,
    wherein the footprints are placed in the virtual environment following the avatar as the avatar moves in the virtual environment,
    wherein the footprints are only visible by certain types of other players.

12. The non-transitory computer-readable storage medium of claim 11, wherein the footprint representation includes representation sound data, and further comprising executable instructions that cause the computer to generate audio data with the visual data using the representation sound data.

13. The non-transitory computer-readable storage medium of claim 11, wherein the footprint representation remains in the virtual environment for a set period of time.

14. The non-transitory computer-readable storage medium of claim 11, wherein the footprints placed in the virtual environment act as a motion indication in medical imaging with customizable visual and audio representations.

15. A method for providing footprints in a computer system that provides a virtual environment, the method comprising:
    accessing an avatar record, where the avatar record indicates an avatar representation that includes data to provide a visual representation of an avatar;
    receiving a selection of a footprint;
    accessing a footprint record, where the footprint record includes footprint representations that include data to provide a visual representation of the selected footprint as a footprint representation;
    associating the footprint representation with the avatar representation;
    receiving avatar movement input that indicates movement of the avatar within the virtual environment;
    generating visual data representing the movement of the avatar and footprints in the virtual environment using the avatar representation and the footprint representation, where the footprints are placed in the virtual environment following the avatar as the avatar moves in the virtual environment; and
    applying the footprints to interact with the virtual environment including causing, enhancing, or enabling growth of vegetation.

* * * * *